United States Patent
Dellow et al.

(10) Patent No.: US 7,895,447 B2
(45) Date of Patent: Feb. 22, 2011

(54) SECURE PROCESSOR ARRANGEMENT

(75) Inventors: Andrew Dellow, Gloucester (GB);
Mark Owen Homewood, North Somerset (GB)

(73) Assignee: STMicroelectronics Limited, Bristol (GB)

( * ) Notice: Subject to any disclaimer, the term of this patent is extended or adjusted under 35 U.S.C. 154(b) by 1239 days.

(21) Appl. No.: 11/020,638

(22) Filed: Dec. 22, 2004

(65) Prior Publication Data
US 2005/0182919 A1 Aug. 18, 2005

(30) Foreign Application Priority Data
Dec. 23, 2003 (EP) .................................. 03258195

(51) Int. Cl.
*G06F 11/30* (2006.01)
*G06F 12/14* (2006.01)
(52) U.S. Cl. .......................... 713/187; 713/189; 726/26
(58) Field of Classification Search .................. 713/187
See application file for complete search history.

(56) References Cited

U.S. PATENT DOCUMENTS

| 5,347,636 | A | * | 9/1994 | Ooi et al. ..................... 711/203 |
| 5,564,111 | A | | 10/1996 | Glew et al. ............. 395/185.06 |
| 6,044,157 | A | | 3/2000 | Uesaka et al. ............... 380/201 |

FOREIGN PATENT DOCUMENTS

| WO | WO 9527247 A1 * | 10/1995 |
| WO | WO 00/10283 | 2/2000 |
| WO | WO 0010283 A1 * | 2/2000 |
| WO | WO 01/97010 A2 | 12/2001 |
| WO | WO 0197010 A2 * | 12/2001 |

* cited by examiner

*Primary Examiner*—Kimyen Vu
*Assistant Examiner*—Yogesh Paliwal
(74) *Attorney, Agent, or Firm*—Lisa K. Jorgenson; Timothy L. Boller; Seed IP Law Group PLLC

(57) ABSTRACT

A system and method for verifying the authenticity of instructions retrieved from a memory for execution by a processor. In one embodiment, an instruction monitor monitors execution parameters associated with the retrieved instruction and resets the system in response to an indication that an instruction is not authentic.

40 Claims, 3 Drawing Sheets

SECURE PROCESSOR ARRANGEMENT

BACKGROUND OF THE INVENTION

1. Field of the Invention

The present disclosure relates to microprocessors and, in particular, to microprocessors used in secure systems such as Pay-TV decoders known generally as set-top-boxes.

2. Description of the Related Art

A conditional access device, which restricts access to data, such as a Pay-TV decoder, typically comprises a processor, cryptographic circuits, memory (such as random access memory or RAM) and inputs and outputs for receiving, decoding and outputting decoded television signals.

We have appreciated the problem of checking that programs that are executed by the processor are authorized and are not "hacked" code. We have further appreciated that simply checking the authenticity of program code in RAM may not be effective because, when executing, code is transferred to cache memory. Checking code every time it is executed from RAM may, therefore, fail to prevent execution of unauthorized code and, in any event, would degrade the performance of the processor.

BRIEF SUMMARY OF THE INVENTION

In one aspect, a system ensures that a processor does not run unauthorized code such that a user obtains access to the system and ultimately unauthorized access to television signals.

In one aspect, a semiconductor integrated circuit comprises a CPU for executing code from memory including an operating system (OS), the CPU being arranged to execute instructions as a pipeline and to use a table to translate virtual addresses of the code to physical addresses in the memory, the CPU being further arranged to expose one or more execution parameters including at least the address of an instruction, the mode of operation of the CPU and whether or not the instruction was executed to completion, the integrated circuit further comprising an instruction monitor arranged to receive the execution parameters and to determine the authenticity of code executed from the memory and to selectively impair function of the integrated circuit if the code is not authentic.

Another aspect involves exposing certain execution parameters from a CPU to a security device on the same integrated circuit. In one embodiment, the main execution parameters are the address of instruction fetches, an operation status identifier (whether in privileged or non-privileged mode) and an identifier showing whether the respective instruction has been executed to completion. These execution parameters can be used to determine whether a given instruction is from the kernel (otherwise known as the core operating system). This allows the security device to check that the kernel code is authentic.

In another aspect, a semiconductor integrated circuit has a CPU for executing code comprising instructions from memory including an operating system (OS), the CPU being arranged to execute the instructions as a pipeline and to use a table to translate virtual addresses of the instructions to physical addresses in the memory, the CPU being further arranged to expose execution parameters including at least an address of an instruction, a mode of operation of the CPU and whether an instruction was executed to completion, the integrated circuit further comprising an instruction monitor arranged to receive the execution parameters and to determine an authenticity of code executed from the memory to selectively impair function of the integrated circuit if the code is not authentic.

In another aspect, an audio-visual decoder comprises a semiconductor integrated circuit having a CPU for executing code comprising instructions from memory including an operating system (OS), the CPU being arranged to execute the instructions as a pipeline and to use a table to translate virtual addresses of the instructions to physical addresses in the memory, the CPU being further arranged to expose execution parameters including at least an address of an instruction, a mode of operation of the CPU and whether an instruction was executed to completion, the integrated circuit further comprising an instruction monitor arranged to receive the execution parameters and to determine an authenticity of code executed from the memory to selectively impair function of the integrated circuit if the code is not authentic.

In another aspect, a pay-TV decoder comprises a semiconductor integrated circuit having a CPU for executing code comprising instructions from memory including an operating system (OS), the CPU being arranged to execute the instructions as a pipeline and to use a table to translate virtual addresses of the instructions to physical addresses in the memory, the CPU being further arranged to expose execution parameters including at least an address of an instruction, a mode of operation of the CPU and whether an instruction was executed to completion, the integrated circuit further comprising an instruction monitor arranged to receive the execution parameters and to determine an authenticity of code executed from the memory to selectively impair function of the integrated circuit if the code is not authentic.

In another aspect, a method of operating a semiconductor integrated circuit in which code from memory, including an operating system, is executed by a CPU comprises: executing instructions of the code from the memory in the CPU; exposing execution parameters from the CPU including at least the address of an instruction, the mode of operation of the CPU and whether or not the instruction was executed to completion; and impairing functioning of the integrated circuit if the code is determined not to be authentic.

In another aspect, a method of operating a semiconductor integrated circuit, including a CPU and a separate hardware instruction monitor, comprises: executing a boot loader from memory; verifying an authenticity of the boot loader using the instruction monitor; loading operating system code from storage to memory to a known physical memory location; verifying an authenticity of the operating system code using the instruction monitor; continually monitoring requests for code from the memory using the instruction monitor by analyzing instruction parameters including at least memory address, mode of operation and whether an instruction was executed to completion; and impairing a function of the circuit when either the boot loader or operating system code is determined not to be authentic, or when the requests for code are made in a high security mode of operation to an address outside a known physical memory location.

In another aspect, a method of operating a processor, comprises: loading a set of instructions into a memory; retrieving an instruction from the memory for execution by the processor; monitoring a first execution parameter for the retrieved instruction; determining whether the retrieved instruction is authentic based at least in part on the monitoring; and inhibiting a function of the system when the retrieved instruction is not authentic.

In another aspect, a computer-readable media contains instructions for causing a system to: load a set of instructions into a memory coupled to a processor; retrieve an instruction from the memory for execution by the processor; monitor a first execution parameter for the retrieved instruction; determine whether the retrieved instruction is authentic based at least in part on the monitoring; and inhibit a function of the system when the retrieved instruction is not authentic.

BRIEF DESCRIPTION OF THE SEVERAL VIEWS OF THE DRAWINGS

Embodiments of the invention will now be described by way of example only and with reference to the figures, in which.

DETAILED DESCRIPTION OF THE INVENTION

An example embodiment is a semiconductor integrated circuit for use in a conditional access device such as a Pay-TV "set-top-box". The invention could equally be applied, though, in other embodiments, such as integrated circuits, for which it is important to ensure that a processor or CPU does not execute unauthorized code.

Figure 1:
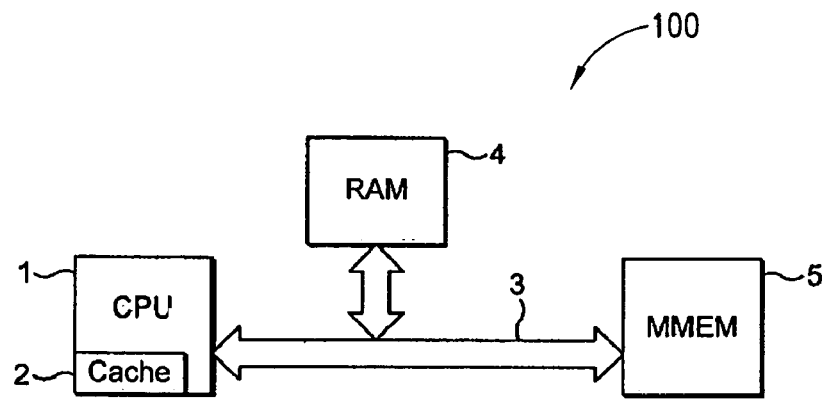
FIG. 1 is a functional block diagram of system embodying the invention.

FIG. 1 is a simplified block diagram of a system 100 embodying the present invention. A CPU 1 equipped with a cache memory 2 (CACHE) is connected to one or several buses 3 for communication (data, addresses, control signals) with peripheral elements. Among the peripheral elements, a RAM 4 intended to contain the data (operands) of the programs being processed as well as the code lines of these programs (at least by blocks) is connected to bus 3. In practice, the programs contained in memory 4 generally originate from a mass storage device 5 (MMEN), for example, a hard disk. This mass storage contains the programs likely to be executed by the CPU 1 as well as the data saved when these programs are not being executed. Of course, several mass storage devices and/or mass storage devices of other types (i.e., CDROM, ROM, floppy disk, flash disk etc.) may be connected to bus 3.

To execute several different applications or programs temporarily stored in RAM 4, CPU 1 has a table of correspondence between so-called virtual addresses of the program which are independent from its storage location and so-called physical addresses corresponding to the physical addresses in the memory, for example memory RAM 4, where the different program lines are stored. This correspondence table is generally stored in buffers and is generally designated as a TLB (Translation Look Aside Buffer).

Figure 2:
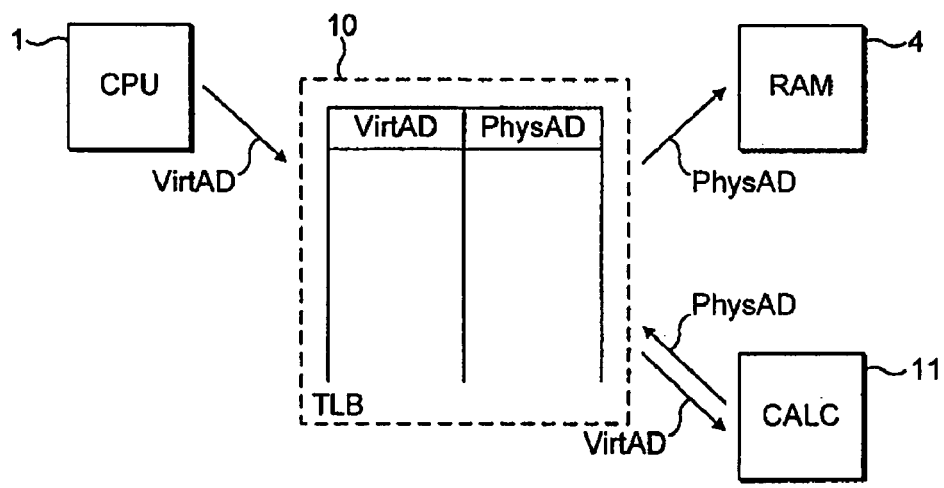
FIG. 2 illustrates a translation lookaside buffer (TLB)

FIG. 2 very schematically and functionally illustrates a correspondence table 10 and the exchanges between the cache memory or register (i.e., CACHE memory 2 of FIG. 1) containing this table and the different elements using it.

On the side of CPU 1, each time an instruction of a program stored in RAM 4 must be executed, this instruction is called by using virtual address VirtAD of this instruction corresponding to the address contained in the program. This virtual address is converted by table 10 into a physical address PhysAD where this instruction is located in RAM 4. RAM 4 then provides the corresponding instruction over the bus (3, FIG. 1) to the CPU 1.

If table 10 does not contain the correspondence between the two addresses, the CPU 1 or, more specifically, a calculation program (block 11, CALC) of the operating system calculates a new correspondence line between the virtual address and the physical address, and writes it into correspondence table 10.

Each time an application contained in RAM 4 must be executed by the CPU 1; the operating system takes over and uses its internal structures to calculate the correspondence table for the involved program.

Figure 3:
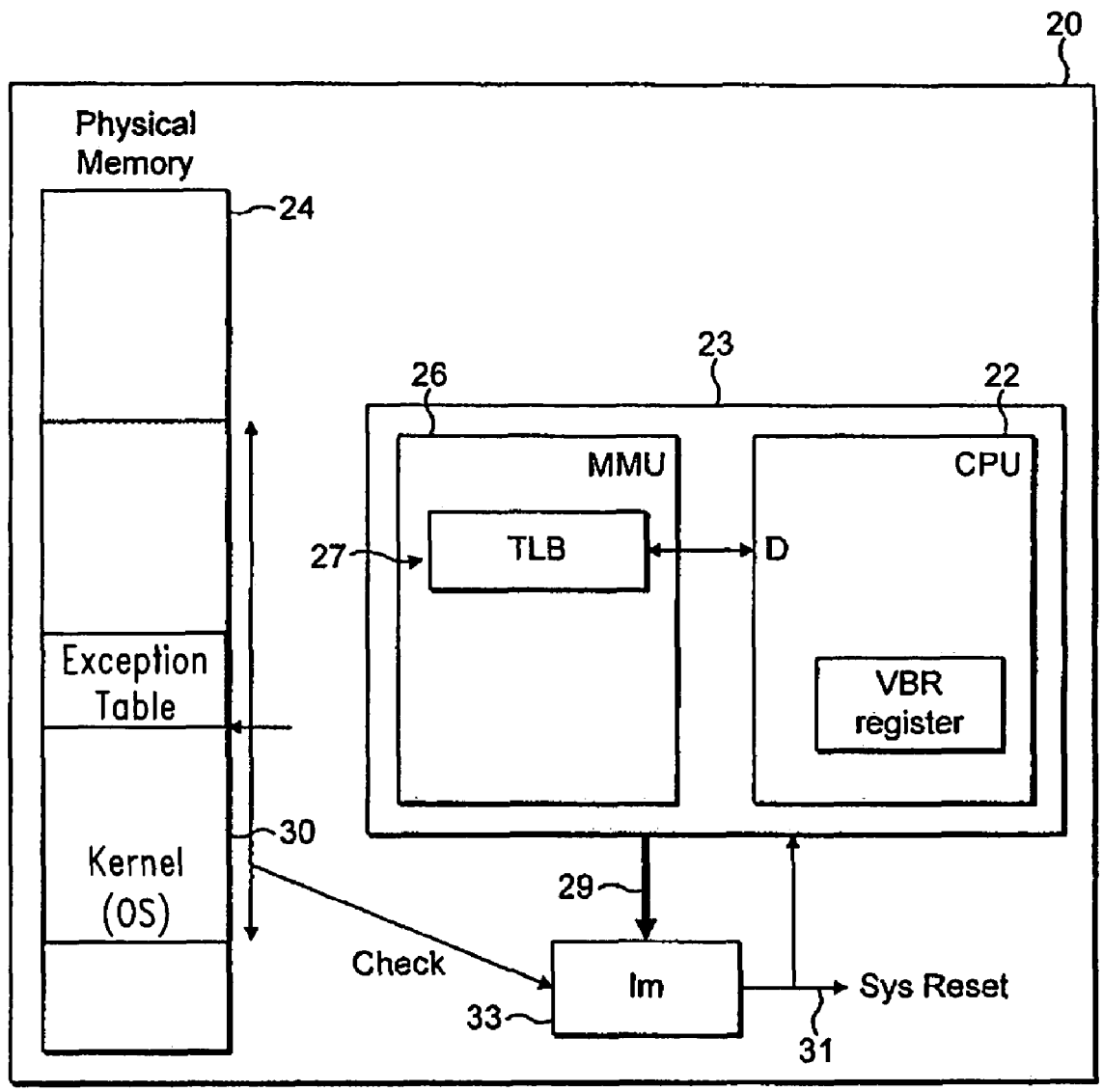
FIG. 3 is a functional block diagram of an architecture of a semiconductor integrated circuit embodying the invention.

An example integrated circuit embodying the invention is shown in FIG. 3 as a schematic representation. The integrated circuit 20 comprises a processor 23 having a CPU 22 arranged to execute code from physical memory 24 via a memory management unit 26 (MMU).

The operation of the integrated circuit 20 will first be described in general before describing the features relevant to the operation of an embodiment of the invention in particular. The CPU 22 executes code from a physical memory 24 in a known fashion. In particular, the CPU 22 executes code as a "virtualized" process in the sense that the CPU 22 requests portions of code from the physical memory 24 according to addresses specified within the code, and those addresses are translated from virtual addresses in code to the physical address in physical memory 24. This allows, for example, two programs to use the same virtual location, but to be located at different physical locations in memory 24 thereby allowing two programs to run at the same time. The translation of addresses from virtual address to physical is performed within a memory management unit (MMU) 26 which includes a translation lookaside buffer (TLB) 27.

The memory management unit 26 thereby translates virtual addresses to physical addresses, provides protection between different users of the CPU resources and allows management of memory resources as only certain amounts of memory are required by a given program at any one time. The memory 24 is split into pages in known fashion (typically 4-8K portions). The MMU 26 thus manages all translations and the TLB 27 comprises a subset of the translations that are actively required at any given time for the pages of code in memory 24.

When any given program from long-term storage is executed, pages of code are swapped into physical memory 24 and translations created in the TLB 27. As that process and other processes continue, pages are swapped in and out of the physical memory 24 to manage the memory resources. After running for some time, pages of code will be located in the physical memory 24 non-contiguously such that pages of code for one program will be mixed with pages of code from another program.

The CPU 22 has two modes of operation. A first mode is known variously as privileged mode or supervisor mode, is the mode in which the CPU 22 executes the core operating system, also known as the kernel 30. A second mode is the user mode also known as non-privileged mode and in this mode the CPU 22 is restricted to certain resources. When the CPU 22 first starts it is in supervisor mode and the supervisor mode can cause a change to the user mode. In the supervisor mode the system resources are set up, including creating the table of translations in the TLB 27 and accessing peripherals to the system.

The present invention addresses the problem of knowing whether any code in the physical memory 24 has been "hacked" such that it is not authentic in the sense that the code was not provided by a trusted party but instead has been replaced by a non-trusted party. Typically, a hacker will try and place an unauthorized code in a CPU of a device such as a set-top-box to try and obtain free access to encrypted television signals.

The inventors appreciated that it is important to be able to trust the core operating system or kernel 30 as if this can be trusted then techniques can be devised to ensure that the remaining code is authentic and can also be trusted. Such code could be user programs, for example. However, there is a problem in that the operating system when loaded will run from pages in memory having virtual addresses as previously described and so checking the kernel in physical memory 24 may not be sufficient to ensure that the instructions for the operating system executed by the CPU 22 are authentic. Also if the exception vector is changed then the CPU 22 might run the kernel from a completely different unchecked region, and a security device would not notice. The inventors appreciated that a memory management unit 26 could be used to provide security by exposing certain execution parameters to a security device shown as instruction monitor 33 as will now be described.

An additional interface to the CPU 22 is provided on line 29, which receives execution parameters from the CPU 22 for instructions executed. These execution parameters allow a further circuit shown as instruction monitor 33 to check the authenticity of the kernel 30 as a determination can be made for each instruction whether or not the instruction relates to the kernel 30 and to determine the actual address of the instruction executed. The only code that operates in privileged mode is the kernel 30 and, so by knowing when the CPU 30 is in privileged mode, the address of the instruction and the fact that the instruction was actually committed allows the instruction monitor 33 to check authenticity of the actual instructions executed.

In some embodiments, it is important to know that an instruction was actually executed to completion (rather than simply fetched from memory) as a CPU 22 will typically run an instruction pre-fetch arrangement in which instructions to be executed are fetched from memory in a speculative manner in the sense that they have not been specifically requested by the program, but a determination has been made that it is likely they will be requested. However, as instructions fetched in speculative pre-fetches may not actually be used, checking the authenticity of instructions based on where they were fetched from would not necessarily allow complete trust in the kernel 30.

The additional security circuit shown as instruction monitor 33 thus receives the execution parameters, including instruction addresses, CPU 22 operation mode (whether privileged or non-privileged) and a status indication showing that the instruction was executed to completion from the processor 23 and retrieves the instruction from memory 24. There are a variety of possible ways of determining authenticity of the executed kernel code. An advantageous method, though, is to perform a signature check on the code, such as by performing a hash function on the instructions and comparing to a stored signature. In the event that the kernel code 30 fails the signature check then the instruction monitor 33 issues a chip reset on line 31. If the whole circuit is simply reset, this prevents any unauthorized operating system code from executing. Other methods of impairing the function could be used.

Figure 4:
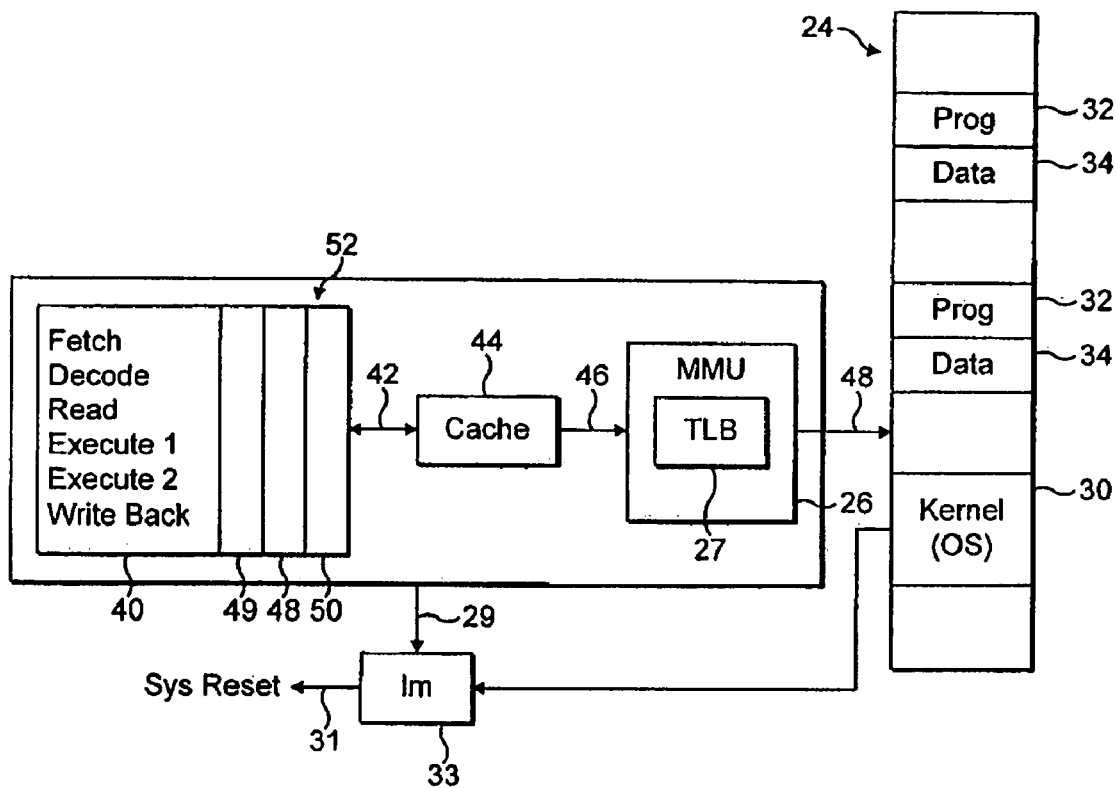
FIG. 4 illustrates an embodiment of the integrated circuit of FIG. 3 in more detail showing the processing of instructions in a pipeline.

The processing of instructions as a pipeline is shown in further detail in FIG. 4. Instructions are executed as a pipeline 40 in a sequence fetch decode read execute 1, execute 2 and write back. These instructions are retrieved from physical memory 24 and addresses translated by the memory management unit 26 via the lookup table TLB 27 as previously described. In addition, there is cache 44, which temporarily stores instructions retrieved over line 46 via the memory management unit 26. When loaded, instructions can be retrieved from cache 44 over line 42 to the instruction pipeline. As a result, this can mean that instructions executed may not need to be retrieved from physical memory 24 again once loaded and this would be a weakness to security unless instructions actually committed were checked as previously described. To allow the execution parameters to be exposed from the processor circuit 23, additional registers 52 are provided as shown schematically. These additional registers store the address of each instruction as it is executed in a register 49, the mode (privileged or non-privileged) as a single bit (0 or 1) in register 48 and an indication that the instruction will complete by determining "going to complete" (or commit) point in register 50. The commit point is the point at which the instruction is committed to happen, in contrast to speculative instruction fetches, which may not actually be completed but forgotten in uncompleted manner if the speculation was incorrectly predicted. Different processors will have different defined commit points, but in the present embodiment it is preferred that the commit point is after execute 1 or execute 2 in the pipeline.

The execution parameters preferably exposed relate to instructions as they are retired (completed) and include:

| | |
|---|---|
| IFETCH | Physical and virtual addresses |
| DACCESS | Physical and virtual data accesses |
| DTYPE | The data type (whether read or write access) |
| PID | The process ID, each process has a number which is not usually retained |
| VALIDITY | i.e., the fact that the instruction was actually committed (completed) |
| U/S | Whether in user or supervisor mode (non-privileged/privileged) which is set at 0 or 1 |
| TRANSON | That the address was actually translated by the TLB |

Figure 5:
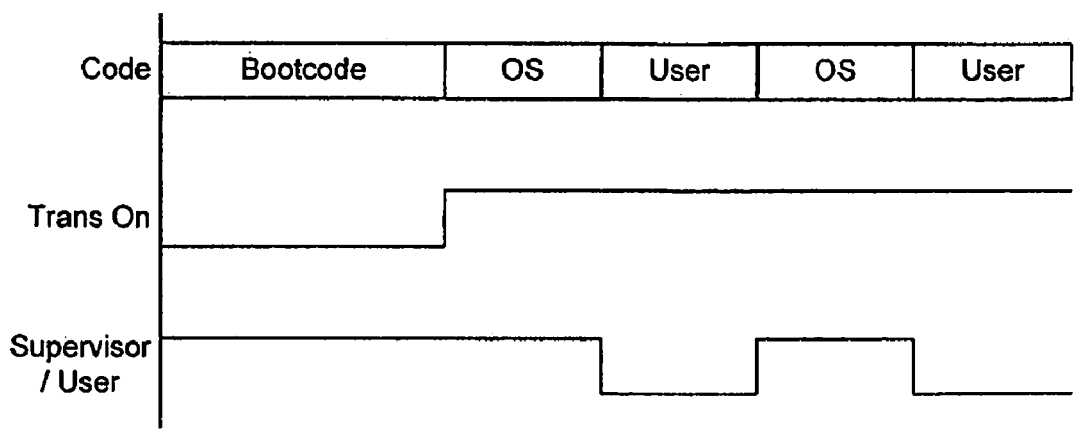
FIG. 5 illustrates a boot sequence of an embodiment.

The boot sequence will now be described with reference to FIG. 5 (as well as the preceding figures). Following a reset of the integrated circuit, the instruction monitor runs a signature check on the memory region where the boot loader is stored (typically flash memory) If the check fails, the circuit is reset.

The processor defaults to the supervisor (privileged) mode and runs the loader (this was in the flash and has just been checked), which places a kernel into a fixed area of physical memory. At this time translation by the TLB is not operational. The instruction monitor is informed the physical address of where the kernel has been placed and its signature and control is then transferred to the kernel.

The kernel then initializes the exception table and updates the VBR register. The exception table resides within the kernel's code region.

The kernel then initializes the exception handler, exception vector table and updates the VBR register. The exception handler and vector table reside within the kernel's code region. The exception handler is a piece of the kernel system; it is called on errors or boundaries between user and supervisor code—an exception or interrupt causes execution to jump to the address stored in the VBR register. The code located in the VBR register is the exception handler.

The instruction monitor 33 runs continually in the background checking the integrity of the loaded kernel, as previously described. For example, this is every five minutes. If a signature check fails, the instruction monitor issues a sys reset on line 31, which resets the system.

The instruction monitor also samples the instruction fetches and checks that fetches occurring in privilege mode (as identified by the exposed execution parameters) have addresses residing within the kernel. A violation causes a system reset to be issued.

The exception vectors allowed are carefully controlled, in other words following boot it should not be possible to modify the exception vector table.

As already described, a preferred embodiment is an integrated circuit for use in a security device. Such a device could be any device where authenticity of code, in particular, an operating system, is important. Such devices include conditional access devices for multimedia and Pay-TV devices.

The term "computer-readable medium" as used herein refers to any medium that participates in providing instructions to a system or a processor for execution. Such a medium may take many forms, including but not limited to, non-volatile media, volatile media, and transmission media. Non-volatile media includes, for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit having a CPU for executing code comprising instructions from memory including an operating system (OS), the CPU being configured to execute the instructions as a pipeline and to use a table to translate virtual addresses of the instructions to physical addresses in the memory, the CPU being further configured to expose execution parameters including at least an address of an instruction, a mode of operation of the CPU and an indication of whether an instruction was executed to completion, the integrated circuit further comprising an instruction monitor configured to receive the execution parameters and to determine, based on at least the exposed address, the exposed mode of operation and the exposed indication, an authenticity of code executed from the memory to selectively impair function of the integrated circuit if the code is not authentic, wherein determining the authenticity of code comprises determining whether the exposed address is from a region of the memory checked by the instruction monitor.

2. A semiconductor integrated circuit according to claim 1 wherein the instruction monitor is arranged to impair function of the integrated circuit if the execution parameters show the mode of operation is a high security mode, and the addresses of the instructions are not addresses of the operating system.

3. A semiconductor integrated circuit according to claim 1 wherein the instruction monitor is arranged to determine the authenticity of code when the execution parameters show the mode of operation is a high security mode.

4. A semiconductor integrated circuit according to claim 1 wherein the mode of operation revealed in the execution parameters include levels of security.

5. A semiconductor integrated circuit according to claim 4, wherein the levels include user and supervisor modes.

6. A semiconductor integrated circuit according to claim 1 wherein the code is user code.

7. A semiconductor integrated circuit according to claim 1 wherein the circuit includes a plurality of CPUs, the instruction monitor being arranged to monitor execution parameters from the plurality of CPUs.

8. A semiconductor integrated circuit according to claim 1 wherein impairing the function is achieved by issuing a chip reset.

9. An audio-visual decoder comprising a semiconductor integrated circuit having a CPU for executing code comprising instructions from memory including an operating system (OS), the CPU being configured to execute the instructions as a pipeline and to use a table to translate virtual addresses of the instructions to physical addresses in the memory, the CPU being further configured to expose execution parameters including at least an address of an instruction, a mode of operation of the CPU and an indication of whether an instruction was executed to completion, the integrated circuit further comprising an instruction monitor configured to receive the execution parameters and to determine, based on the exposed address, the exposed mode of operation and the exposed indication, an authenticity of code executed from the memory to selectively impair function of the integrated circuit if the code is not authentic, wherein determining an authenticity of the code comprises determining whether the exposed address is from a region of the memory checked by the instruction monitor.

10. The audio-visual decoder of claim 9 wherein the semiconductor integrated circuit includes a plurality of CPUs, the instruction monitor being arranged to monitor execution parameters from the plurality of CPUs.

11. The audio-visual decoder of claim 9 wherein impairing the function is achieved by issuing a chip reset.

12. A pay-TV decoder comprising a semiconductor integrated circuit having a CPU configured to execute code comprising instructions from memory including an operating system (OS), the CPU being configured to execute the instructions as a pipeline and to use a table to translate virtual addresses of the instructions to physical addresses in the memory, the CPU being further configured to expose execution parameters including at least an address of an instruction, a mode of operation of the CPU and an indication of whether an instruction was executed to completion, the integrated circuit further comprising an instruction monitor configured to receive the execution parameters and to determine, based on the exposed address, the exposed mode and the exposed indication, an authenticity of code executed from the memory to selectively impair function of the integrated circuit if the code is not authentic, wherein determining an authenticity of the code comprises determining whether the exposed address is from a region of the memory checked by the instruction monitor.

13. The pay-TV decoder of claim 12 wherein the instruction monitor is arranged to determine the authenticity of code when the execution parameters show the mode of operation is a high security mode.

14. The pay-TV decoder of claim 12 wherein the mode of operation revealed in the execution parameters include levels of security.

15. The pay-TV decoder of claim 14 wherein the levels include user and supervisor modes.

16. A method of operating a semiconductor integrated circuit in which code from memory, including an operating system, is executed by a CPU, the method comprising:
   executing instructions of the code from the memory in the CPU;
   exposing execution parameters from the CPU including at least the address of an instruction, the mode of operation of the CPU and an indication of whether the instruction was executed to completion;
   selectively authenticating the code based on the exposed address, mode and indication, wherein authenticating the code comprises determining whether the code is from a checked region of the memory; and
   impairing functioning of the integrated circuit if the code is determined not to be authentic.

17. The method of claim 16, further comprising:
   executing instructions of the code from the memory in a second CPU;
   exposing execution parameters from the second CPU; and
   impairing functioning of the integrated circuit if the code executed by the second CPU is determined not to be authentic.

18. The method of claim 16 wherein impairing functioning of the integrated circuit comprises issuing a chip reset.

19. A method of operating a semiconductor integrated circuit including a CPU and a separate hardware instruction monitor, the method comprising:
   executing a boot loader from memory;
   verifying an authenticity of the boot loader using the instruction monitor;
   loading operating system code from storage to memory to a known physical memory location;
   verifying an authenticity of the operating system code using the instruction monitor;
   to monitor and analyze instruction parameters including at least a memory address, a mode of operation and whether an instruction was executed to completion;
   impairing a function of the circuit when either the boot loader or operating system code is determined not to be authentic; and
   impairing a function of the circuit when the requests for code are made in a high security mode of operation to an address outside the known physical memory location.

20. The method of claim 19 wherein the semiconductor integrated circuit includes a second CPU.

21. The method of claim 19 wherein impairing a function of the circuit comprises issuing a chip reset.

22. A system comprising:
   means for executing instructions;
   a first memory to store instructions for execution by the means for executing instructions;
   means for retrieving an instruction from the first memory;
   means for exposing instruction parameters including at least memory address, mode of operation and an indication of whether an instruction was executed to completion; and
   means for verifying, based on the exposed memory address, mode of operation and indication, an authenticity of a retrieved instruction coupled to the means for exposing instruction parameters, wherein the verifying comprises determining whether the exposed memory address is from an appropriate region of the memory.

23. The system of claim 22 wherein the means for executing instructions comprises a plurality of processors.

24. The system of claim 22 wherein the means for retrieving an instruction comprises a memory management unit and a cache memory.

25. The system of claim 22 wherein the means for verifying an authenticity comprises an instruction monitor.

26. The system of claim 22 wherein the means for verifying an authenticity comprises means for resetting the system.

27. The system of claim 22 further comprising a mass storage device.

28. The system of claim 22 wherein the means for verifying an authenticity of an instruction is configured to verify an authenticity after the instruction is executed.

29. A method of operating a processor, comprising:
   loading a set of instructions into a memory coupled to the processor;
   retrieving an instruction from the memory for execution by the processor;
   monitoring execution parameters for the retrieved instruction, the parameters including an address in the memory, a mode of operation and an indication of whether the instruction was executed to completion;
   determining whether the retrieved instruction is authentic based at least in part on the monitored address, mode and indication execution parameters, wherein the determining comprises determining whether the monitored address is from a region of the memory; and
   inhibiting a function of the system when the retrieved instruction is not authentic.

30. The method of claim 29 wherein loading a set of instructions into a memory comprises loading the set of instructions into a first portion of the memory and determining whether the monitored address is from a region of the memory comprises determining whether the instruction was retrieved from the first portion of the memory.

31. The method of claim 29 wherein the mode of operation parameter includes levels of security.

32. The method of claim 29 wherein the region of the memory is a region storing an operating system.

33. The method of claim 29 wherein inhibiting a function of the system comprises resetting the system.

34. The method of claim 29, further comprising loading the retrieved instruction into a cache memory.

35. The method of claim 29 wherein the set of instructions corresponds to a kernel and the monitoring is periodic.

36. A non-transitory computer-readable media from which a computer can read, the media containing instructions for causing a system to:
   load a set of instructions into a memory coupled to a processor;
   retrieve an instruction from the memory for execution by the processor;
   monitor execution parameters for the retrieved instruction, the parameters including an address of the instruction, a mode of operation, and an indication of whether the instruction has been executed;

determine whether the retrieved instruction is authentic based at least in part on the monitored address, mode and indication execution parameters, wherein the determining whether the retrieved instruction is authentic comprises determining whether the monitored address is from a region of the memory; and inhibit a function of the system when the retrieved instruction is not authentic.

37. The non-transitory computer readable media of claim 36 wherein the instructions cause the system to load a retrieved instruction into a cache memory.

38. The non-transitory computer readable media of claim 36 wherein the instructions cause the system to reset when a retrieved instruction is not authentic.

39. The computer readable media of claim 36 wherein the mode of operation parameter includes a security level of the processor.

40. The computer readable media of claim 36 wherein the region of the memory is a region authorized to store an operating system.

* * * * *

UNITED STATES PATENT AND TRADEMARK OFFICE
CERTIFICATE OF CORRECTION

| | |
|---|---|
| PATENT NO. | : 7,895,447 B2 |
| APPLICATION NO. | : 11/020638 |
| DATED | : February 22, 2011 |
| INVENTOR(S) | : Andrew Dellow et al. |

It is certified that error appears in the above-identified patent and that said Letters Patent is hereby corrected as shown below:

IN THE CLAIMS:

Column 9

Claim 19, Line 49, "using the instruction monitor;" should read as --using the instruction monitor--.

Signed and Sealed this

Nineteenth Day of April, 2011

David J. Kappos
*Director of the United States Patent and Trademark Office*